March 3, 1964 F. B. MERCER 3,123,512
APPARATUS FOR MAKING A REINFORCED PLASTIC NET
Filed Nov. 25, 1960 2 Sheets-Sheet 1

INVENTOR
FRANK BRIAN MERCER,
BY
ATTORNEY

March 3, 1964  F. B. MERCER  3,123,512
APPARATUS FOR MAKING A REINFORCED PLASTIC NET
Filed Nov. 25, 1960  2 Sheets-Sheet 2
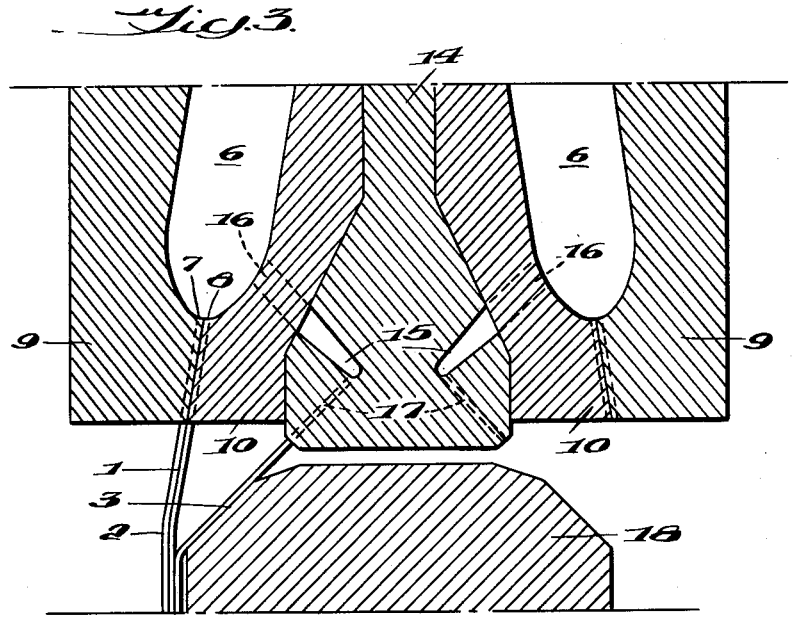
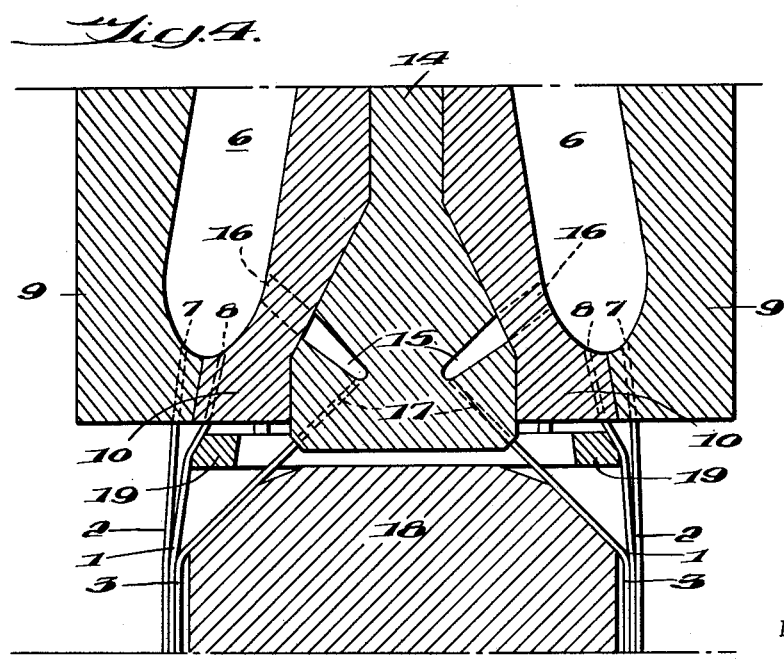
INVENTOR
FRANK BRIAN MERCER,
BY
ATTORNEY

United States Patent Office 3,123,512
Patented Mar. 3, 1964

3,123,512
APPARATUS FOR MAKING A REINFORCED PLASTIC NET
Frank Brian Mercer, Kenolbri, England, assignor to Plastic Textile Accessories Limited, Blackburn, England
Filed Nov. 25, 1960, Ser. No. 71,592
3 Claims. (Cl. 156—441)

This invention relates to reinforced plastic netting, and to a process and apparatus for making it continuously in concentric circular dies.

Plastic net bags are being introduced to the trade for packaging various articles such as produce and candy bars. A process and apparatus for making tubular plastic netting suitable for preparing such bags are disclosed in Mercer, U.S. Patent 2,919,467. For reasons of economy and appearance, it is desirable in many cases to use netting which is not sufficiently stable to retain rectangular bag-like dimensions during and after filling. For example, the filling of plastic net bags of diamond shaped mesh may be complicated by the tendency of the bags to elongate under the weight of the contents. This can be particularly troublesome in the filling of bags with onions, oranges or potatoes. The resulting package often assumes the shape of a long tube rather than that of a conventional bag of somewhat rectangular shape.

It is an object of this invention to provide a process and apparatus for preparing tubular netting reinforced in the longitudinal direction. A further object is to provide such a process and apparatus which will accomplish this as the plastic netting is being extruded. A still further object is to provide such a process and apparatus which will continuously produce dimensionally stable tubular netting.

These and other objects are accomplished by the instant invention which comprises, in a process for extruding tubular plastic net-like structures composed of two layers of parallel strands, said layers being adjacent and the strands of one layer being in intersecting relation with the strands in said other layer, the improvement which consists in contacting one of said layers while still in the molten, adhesive state with a third layer of parallel strands which are parallel to the direction of extrusion and uniting said layers so that the strands of one layer are in intersecting relation with the strands of the other layer.

This invention further comprises an apparatus having a pair of concentric die-carrying members having surfaces in contacting relationship, each member having a set of strand-extruding dies having discharge orifices which open on said surfaces at the extrusion end of said dies and means for rotating said members, in combination with means for introducing a third layer of parallel strands parallel to the direction of extrusion and means for contacting said third layer of strands with one of the layers of strands produced by said strand-extruding dies as the latter emerge from their orifices.

In this invention, a tubular net with two layers of parallel intersecting strands is produced and a third layer of parallel strands is subsequently laid down over one of the two layers so that a three layer net is produced. The third layer is applied after the two layer net has been extruded and at such a time and distance that the layers of the two layer net are still molten and adhesive.

The reinforcing members may be plastic filaments or tapes or nonplastic threads. They may be fastened to either the joints or the strands of the netting or both. The number and size or shape of these auxiliary longitudinal strands depends on the amount of reinforcement required.

The chemical nature of the strengthening elements also is related to the desired reinforcement. In some cases it is convenient for these strands to be composed of the same plastic as the netting. This means that the plastic generally is polyethylene, polypropylene, nylon or polyvinyl chloride. The nonplastic strengthening threads may be made of cotton or other fibrous material including glass, or of metal. As in the case of the strands in the netting, the reinforcing strands may have various cross-sectional shapes. Circularly shaped filaments generally are preferred, but others are operable such as square, oval or flat on one side, similar to a capital "D."

The invention will now be described in reference to the following drawings wherein:

FIG. 3 is a view similar to FIG. 2 showing the modification of separate extrusion of the third layer of strands.

FIG. 4 is a view similar to FIG. 3 showing the modification wherein all the layers are individually extruded and united after extrusion.

Figure 1:
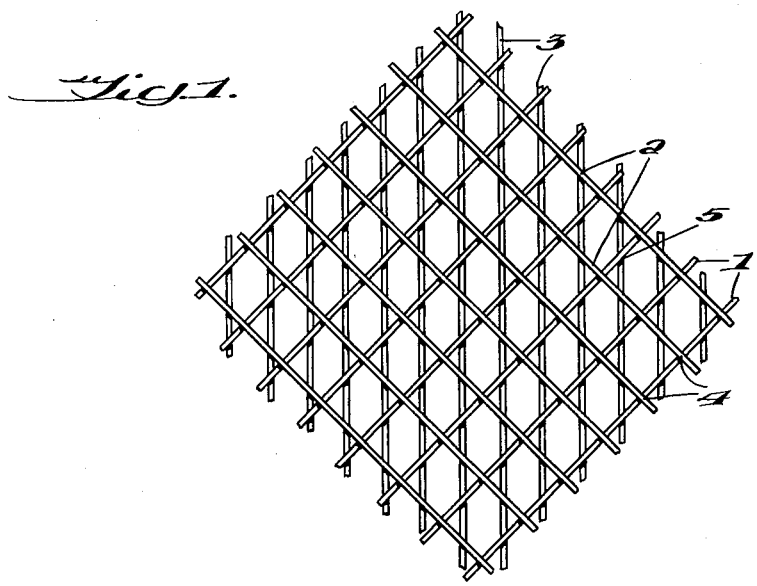
FIG. 1 is a sketch of a portion of a net produced by the invention.

In FIG. 1 a portion of a net produced by the invention is illustrated showing diagonal strands 1 and 2 and longitudinal strands 3. The layers of diagonal strands are connected together at intersections 4 while the longitudinal strands are connected to only one layer of diagonal strands at intersections 5. In terms of structure of the net produced, the net of FIG. 1 will be that of a net produced according to Mercer, U.S. Patent 2,919,467 with parallel, longitudinal reinforcing strands laid down on one or the other sides.

Figure 2:
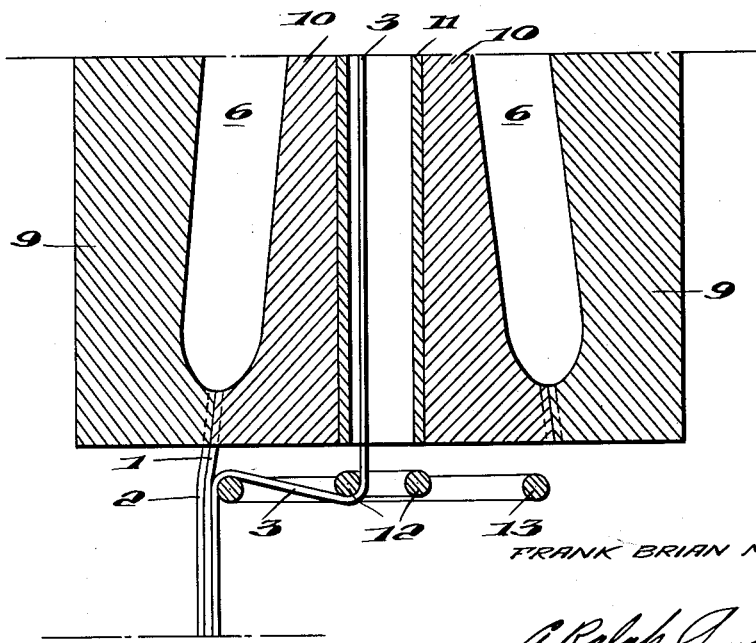
FIG. 2 is a cross-sectional view of the lower die-carrying portion of an extruding head of an apparatus according to this invention showing means for introduction of a third layer of preformed strands.

FIG. 2 illustrates an embodiment of an apparatus according to this invention wherein a layer of preformed filaments, represented by single filament 3, is contacted with filaments of freshly extruded net composed of filaments 1 and 2. By preformed filaments is meant threads, strings, monofils, etc.

Molten plastic in cavity 6 is extruded through dies 7 and 8 in contra-rotating inner and outer annular die-carrying members 9 and 10 respectively each having a contacting surface, the outer curved surface of said inner die-carrying member sliding on the inner curved surface of said outer die-carrying member and having cooperating complementary die-forming orifices which open on said surfaces at the extrusion end of said dies. A net is produced of layers of diagonal filaments 1 and 2. Preformed filament 3 is introduced down the hollow shaft 11. It is directed down through ring 12 and up through and around the outside of ring 13 to the point where it is contacted with filaments 1. Since this contacting takes place while filaments 1 are in their molten, adhesive state, a firm bond is established resulting in a net of three layers of parallel strands depicted in FIG. 1. Rings 12 and 13 are supported from the bottom by suitable means known in the art (not shown).

In FIG. 3, a modification is shown wherein the two layer diagonal strand net is extruded in the same manner as in FIG. 2 but the reinforcing strand 3 is freshly extruded. In this apparatus, a center stationary die-carrying member 14 is provided with an annular slot or groove 15 which is fed molten plastic from cavity 6 through a plurality of feed holes 16 located in rotating die-carrying member 10. At the base of the annular slot or groove 15 are a plurality of individual orifice dies 17 for the extrusion of the third layer of reinforcing strands 3. The third layer of strands extruded by orifices 17 are guided over the surface of frusto-conical shaped former 18 and into contact with the inner layer of the net extruded from dies 7 and 8. Since the center die-carrying member is stationary, the strands 3 produced will be parallel and longitudinal. The apparatus in FIG. 3 could be further modified to include elongations on the die orifices 17 so as to introduce the reinforcing strand to the net at a point nearer the discharge orifices of the net dies 7 and 8.

FIG. 4 illustrates a modification of the apparatus in FIG. 3. The primary difference is that the net dies 7 and 8 are discrete orifices which will not form integrally extruded intersections. In this modification, all the layers of strands must be united outside the dies themselves. Strands 1 and 2 are united by passing them over the surface of former 19 which is attached to the die-carrying member 10. The third reinforcing strand 3 is produced as in FIG. 3 and is united with the net in the same manner as shown therein.

In all of the above drawings, the die-carrying members may be rotated by suitable means which are not shown. Mercer, U.S. Patent 2,919,467 illustrates suitable rotating means as well as plastic supply means and other mechanisms which may be desired and are known to those skilled in the art.

Although the apparatus described above show the layer of reinforcing strands being applied to the inside of the extruded tubular net, means could be devised to apply them to the exterior strands of the net. Such reinforcing strands can be separately extruded from a different plastic supply thus enabling the use of a polymer different from that used in the net.

This invention provides a satisfactory method and apparatus for the preparation of reinforced plastic nets. Bags made from such reinforced nets are far more desirable to the packaging and produce industries since they eliminate one of the most serious shortcomings experienced in the use of plastic net bags, i.e., poor dimensional stability.

What is claimed is:

1. A tubular plastic net extrusion apparatus comprising a pair of rotating concentric annular die-carrying members, each having a contacting surface, the outer curved surface of said inner die-carrying member contacting the inner curved surface of said outer die-carrying member, each die-carrying member having formed therein a set of strand extrusion dies having cooperating complementary die-forming orifices which open on said surfaces at the extrusion end of said members, and means for rotating said members; in combination with means for introducing a third layer of parallel strands parallel to the direction of extrusion, and means for contacting said third layer of strands with only one of the layers of strands produced by said strand extrusion dies as the latter strands emerge from their extrusion orifices.

2. Apparatus according to claim 1 wherein said means for introducing said third layer of strands comprises a set of stationary strand-extruding die orifices concentric with said rotating die members.

3. Apparatus according to claim 1 wherein said means for introducing said third layer of strands comprises means for guiding preformed filaments down a hollow center shaft of said apparatus defined by the curved inner surface of said inner annular die-carrying member and means for guiding said filaments into contact with said extruded net strands.

References Cited in the file of this patent

UNITED STATES PATENTS

| | | |
|---|---|---|
| 692,467 | Mugnier | Feb. 4, 1902 |
| 1,834,556 | Toles | Dec. 1, 1931 |
| 2,382,177 | Schanz | Aug. 14, 1945 |
| 2,502,514 | Ewer | Apr. 4, 1950 |
| 2,561,569 | Flynn | July 24, 1951 |
| 2,738,298 | David et al. | Mar. 13, 1956 |
| 2,919,467 | Mercer | Jan. 5, 1960 |
| 2,956,305 | Raydt | Oct. 18, 1960 |
| 3,029,174 | Schultheiss | Apr. 10, 1962 |